United States Patent [19]

Boucher

[11] Patent Number: 4,614,943
[45] Date of Patent: Sep. 30, 1986

[54] DEVICE FOR THE REMOTE CONTROL OF THE POSITION OF A MOBILE SUPPORT

[75] Inventor: Gilles Boucher, 79 rue des Chantiers, 78000 Versailles, France

[73] Assignee: Gilles Boucher, Paris, France

[21] Appl. No.: 511,517

[22] Filed: Jul. 7, 1983

[30] Foreign Application Priority Data

Jul. 15, 1982 [FR] France .............................. 82 12346

[51] Int. Cl.⁴ .............................................. G03B 39/00
[52] U.S. Cl. .................................. 340/825.00; 354/70; 354/81; 354/293; 352/243
[58] Field of Search .......................... 340/937, 825.00; 901/15, 16; 354/293, 70, 81; 352/243, 244; 248/296, 550, 652, 662; 358/125

[56] References Cited

U.S. PATENT DOCUMENTS

4,158,489 6/1979 Gottschalk ............................ 354/70
4,208,028 6/1980 Brown et al. ......................... 354/293
4,420,238 12/1983 Felix ..................................... 354/293

Primary Examiner—Donald J. Yusko
Assistant Examiner—Sharon L. Hodgkins
Attorney, Agent, or Firm—Burgess, Ryan & Wayne

[57] ABSTRACT

A device for remotely controlling the position and orientation of a camera borne by a vehicle includes a first support member including two arms and an intermediary bracket. The arms have first ends pivotally mounted in a substantially vertical plane to the vehicle for movement in the vertical plane and about the substantially vertical plane, and opposite, second ends pivotally secured to the intermediary bracket to form a pivoting parallelogram structure, with the intermediary bracket always remaining in a substantially upright position during the movement of the arms. A parallelogram jack is pivotally secured between a substantially fixed point of the parallelogram structure an one of the arms for pivoting the arms in the substantially vertical plane. A rotation jack is pivotally secured between a fixed point of the vehicle and at least one of the arms for rotating the arms about the substantially vertical plane. A second support member is secured to the first intermediary bracket for bearing the camera and includes orientation motors or orienting the camera in inclination and azimuth relative to the first intermediary bracket. A remote control device is provided within the vehicle for controlling the parallelogram and rotation jacks of the first support member and the orientation motors of the second support member to cause the camera to follow a travelling mobile unit.

11 Claims, 6 Drawing Figures

DEVICE FOR THE REMOTE CONTROL OF THE POSITION OF A MOBILE SUPPORT

BACKGROUND OF THE INVENTION

The present invention concerns a device for the remote control of the position of a bed-plate borne by a mobile apparatus such as a camera holder plate mounted on an automotive vehicle.

Numerous techniques are known to remotely control the orientation of a view finder element in order to follow the displacement or evolution of mobile elements by the use of view finder elements which can be a piece of artillery in military applications or a cinema or television camera in certain civil applications. By rotating the view finder element in two orthogonal planes by the use of a control and electric motors or hydraulic jacks in the applications requiring considerable effort, it is easy to achieve a complete sweep of all the space by the view finder element.

When the view finder element such as a camera, is mounted on a rapidly moving element and subjected to a field of intense and varied vibrations, such as a fast-moving automotive vehicle, the following of the evolution of another moving element such as a moving subject being filmed becomes more aleatory since, on the one hand, the view finder element cannot always be rapidly disposed for alignment with moving subjects, and is often hampered by blind angles of the vehicle, and on the other hand, the vibrations and oscillations of the carrier vehicle are transmitted to the camera holder plate, sometimes being amplified and rendering certain images blurred while partially blocking the sight and sometimes temporarily blocking the jacks and/or orientation motors of the support plate.

SUMMARY OF THE INVENTION

The present invention permits, through totally remote control, the taking of clear images by using one or several cameras borne by a rapidly moving vehicle such as an automobile, a motorcycle, a vehicle propelled on an air cushion (aero or hovercraft) or even an aeroplane or a helicopter while faithfully following by sight the diverse evolutions of the subject and/or the object to be filmed.

For this purpose, the device for the remote control of the position of a support borne by a mobile device, such as a camera holder plate mounted on an automotive vehicle, comprises according to the invention: a first orientation stage comprising two arms or groups of arms articulated as a parallelogram and able to be moved in a general vertical plane under the action of a parallelogram jack interposed between a fixed point of the parallelogram such as an articulation of one arm and another opposite arm (or group of arms), the two arms (or groups of arms) being articulated, at one of their ends, to a rigid intermediary support maintained in a substantially vertical position during free displacement of the arms of the parallelogram in a vertical plane and at the other extremity, to a rotation support adapted to provide rotation in a general horizontal plane about a substantially vertical axis of rotation, by the action of a rotation jack or motor abutting on the mobile device; a second orientation stage mounted on a first intermediary plate carried by the rigid intermediary support and within which the support itself such as the camera holder plate is orientable in inclination and azimuth by operation of orientation jacks or motors; individual remote-control means for the direction and the speed of displacement of each of the jacks or motors of the first and second orientation stages providing remote control for following by the camera of another moving subject by changing the azimuth and the inclination of the camera holder plate with reference to the first intermediary plate while providing good damping of the vibrations which may be transmitted by the mobile appartus to the first intermediary plate and covering a wider field by displacement of the two orientation stages. The first intermediary plate carried by the intermediary support carries a first vertical orientation shaft on which is positioned for rotation in a substantially horizontal plane, a second intermediary plate, the position of which in rotation, is controlled by a jack or an orientation motor in azimuth, this second intermediary plate supporting a second horizontal orientation shaft that is rigidly connected to a camera holder plate, the rotation of this second shaft in a substantially horizontal plane being controlled by a jack or motor for orientation of the inclination of the camera.

The two jacks or motors of the first orientation stage can be slaves either to a unit for stabilization in position that delivers to these jacks or motors correction orders adapted to maintain the first intermediary plate in a substantially horizontal position either to a damping unit that delivers to these jacks or motors, correction orders adapted to damp the oscillations induced at this first stage by the displacement of the support apparatus.

According to another embodiment of the invention, the parallelogram and/or rotation jacks of the first orientation stage cooperate with at least one shock absorber element for the displacements of the articulated arms under the action of these jacks, this shock absorber element being able to be included in the corresponding jack.

As a variant, the shock absorber element cooperating with at least one of the two jacks of the first stage can be a shock absorber such as a relaxation absorber or a beater that allows low oscillation frequencies to pass to the first stage of about 1 to 1.5 Hz and damps the high frequencies above values of about 25 Hz for an automotive vehicle.

According to another embodiment of the invention, the first orientation stage is provided with jacks which give this stage a variable and relatively slow angular movement but nevertheless allow reaction forces induced at the articulated arms by the path on which the plate holder is displaced, whereas the second stage is provided with jacks or rotation motors for the orientation in inclination and of the variable angular rotation which is more rapid in order to follow faithfully the course of another moving element at which the camera is aimed.

According to an embodiment for limiting the interference vibrations to which the camera holder plate is subjected, the first orientation stage is fixed on the mobile carrier through a suspension, the stiffness of which is selected in such a way as to thoroughly filter the average vibration frequencies of the body of the carrier vehicle, of about 1.5 to 25 Hz for a current automotive vehicle.

According to another embodiment that concerns eliminating as completely as possible the most harmful vibrations for a photographic camera, the first orientation stage is fixed on the carrier vehicle in a zone where the high frequency vibrations, especially frequency vibrations comprised between 25 and 40 Hz, particularly harmful for the taking of photographs, of a camera are relatively diminished through a suspension adapted to filter vibration frequencies comprised between 25 and 40 Hz.

The first intermediary plate is preferably adjustably fixed on the intermediary support and at a level such that the center of gravity of the equipment that it carries is placed substantially half-way between the two articulations of the arms on the intermediary support.

According to another embodiment of the invention, the first orientation stage is rotatable by the rotation motor over an angle larger than 360° while being limited in its rotation by abutments which prevent the destruction of the cable(s) connection between the vehicle and the camera and the jacks or motors of the first and second orientation stage. The stroke angles of the camera holder plate are limited to lower values in the range of 60° for permitting from a fixed point of the mobile carrier, such as an automobile roof or a helicopter underbelly, to sweep all the azimuths by rotation of the first orientation stage while reducing support bulkiness at the rest position of the vehicle.

BRIEF DESCRIPTION OF THE DRAWINGS

Other aims, advantages and characteristics of the present invention will be apparent from reading an embodiment of the invention given by way of the non-limitative examples with reference to the annexed drawings in which.

DESCRIPTION OF THE PREFERRED EMBODIMENTS

Figures 1, 1A:
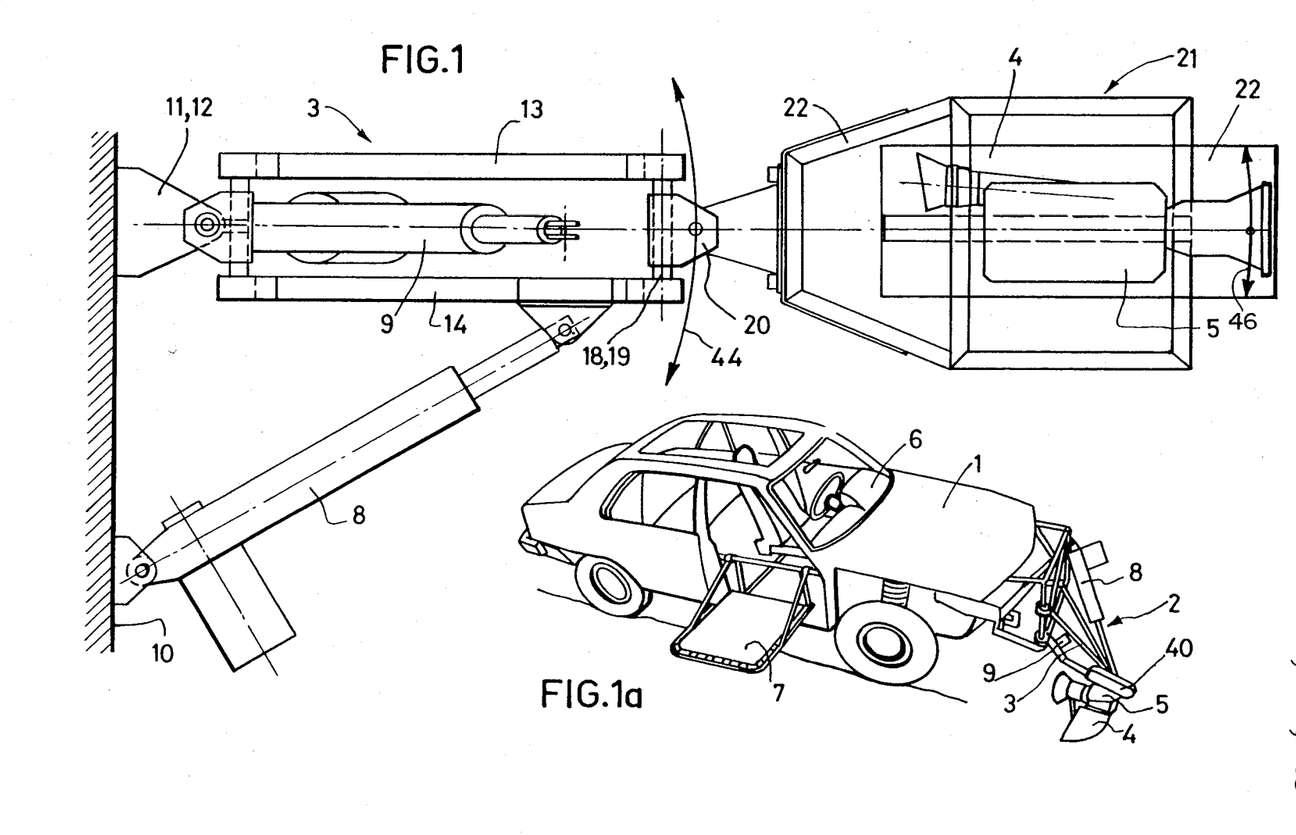
FIG. 1 represents a view from above of a remote control for a camera holder plate.
FIG. 1a represents in perspective, an automotive vehicle equipped with a remote control device for the camera holder plate shown in FIG. 1.

FIG. 1a shows an automotive vehicle 1 that is equipped in the front with a camera holder arm 2 comprising a first orientation stage 3 realized in tubular elements which sustain a plate or a camera holder base 4 on which is mounted a cinema or television camera 5, the orientation of which can be remotely controlled from the seat of vehicle 1, for example by using an ON-OFF control switch mounted on the dashboard 6 of vehicle 1, that has, for example, a platform 7 on wich can be positioned an operator or an actor to be filmed by camera 5. According to the invention, the first orientation stage 3 can be displaced in rotation in a horizontal plane under the control of a rotation jack 8 and in vertical plane under the control of a parallelogram jack 9 that acts on one of the two parallel arms constituting the first orientation stage 3.

FIG. 1, which represents on a larger scale the camera holder arm 2, mounted on vehicle 1 of FIG. 1a, shows that this arm is fixed to chassis 10 of the vehicle with the use of clamps 11 and 12 which can constitute a suspension filtering, for example, average frequencies of the vehicle (between 1 and 25 Hz for example), or higher vibration frequencies (between 25 and 40-50 Hz for example). Such a suspension can be realized by means of single sleeves or "silent-blocks" made of an elastomer having an appropriate hardness and internal damping coefficient. The numbers applied to the elements of FIG. 1a are brought forward to the same elements features in FIGS. 1 to 5.

Figure 2:
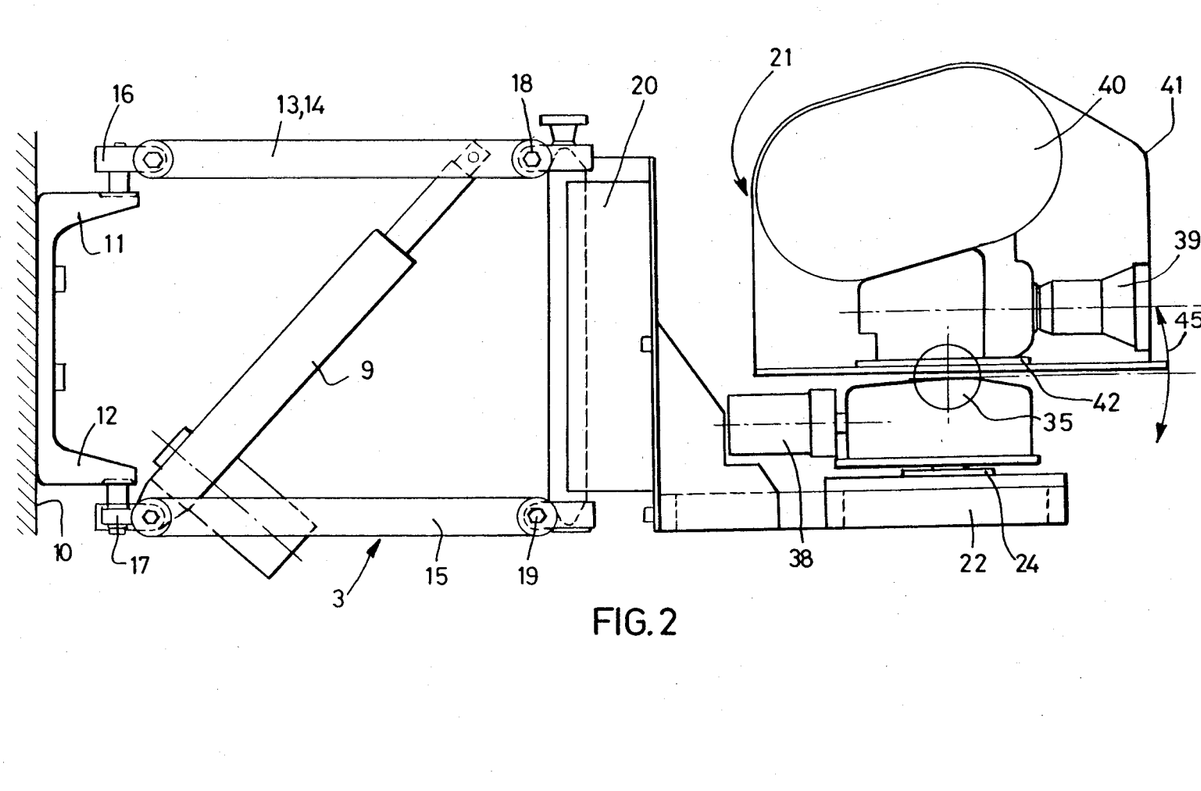
FIG. 2 is a side view of the device of FIG. 1.

The first orientation stage 3 that is shown more clearly on the side view of FIG. 2 comprises two groups of upper arms 13 and 14 and a group of lower arms 15, of which only one of the arms appears on FIG. 2. These two groups of arms are articulated as parallelograms, at one extremity, rotatably to a support in two parts, an upper part 16 and a lower part 17, and at the other end by articulations 18 and 19 to a rigid intermediary support 20 on which is mounted by any adequate means such as screws, and in an adjustable way, a first intermediary plate 22 relatively rigid and on which it is possible to mount a base 4 of the camera holder, for example, by means of screws (not shown), and on which is disposed a second orientable stage 21.

Figure 4:
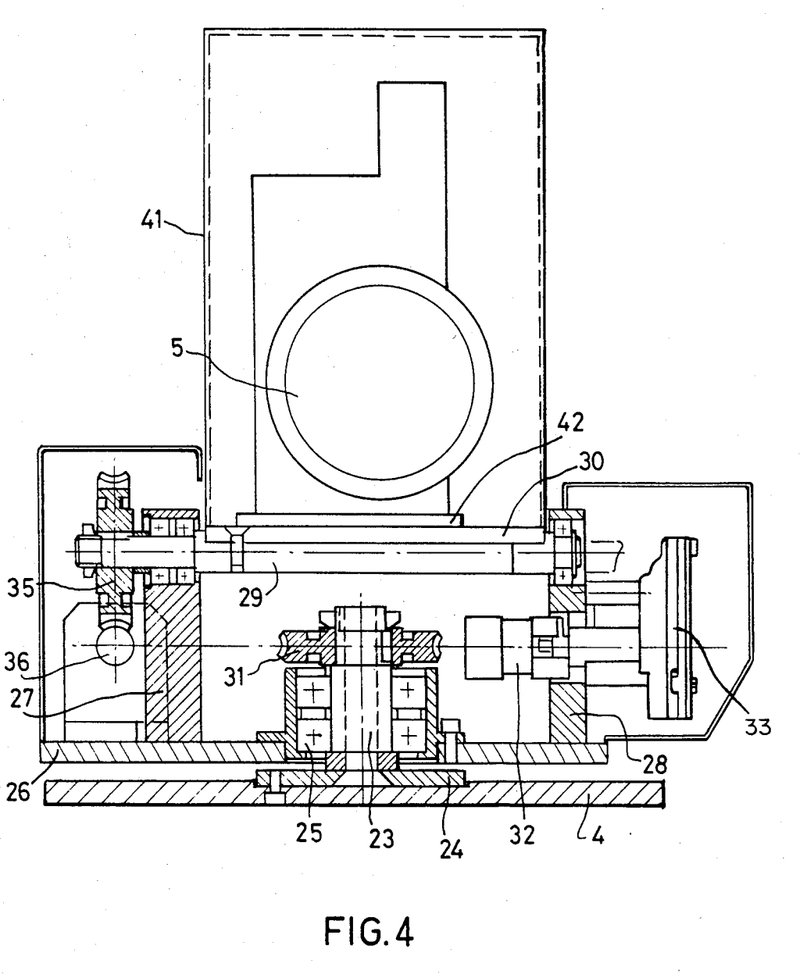
FIG. 4 is a transverse section of the equipped camera holder plate shown in FIG. 3.

FIG. 4 shows how camera 5 is connected to base 4 through the intermediary of a first orientation shaft 23 fixed vertically by a plate 24 and on the base 4 and about which is rotatable on ball bearings 25, a second intermediary plate 26 that bears uprights 27 and 28. A second orientation shaft 29 is mounted horizontally on ball bearings in uprights 27 and 28 and carries by use of screws, a camera holder plate 30 per se, on which is fixed the camera 5.

Figure 3:
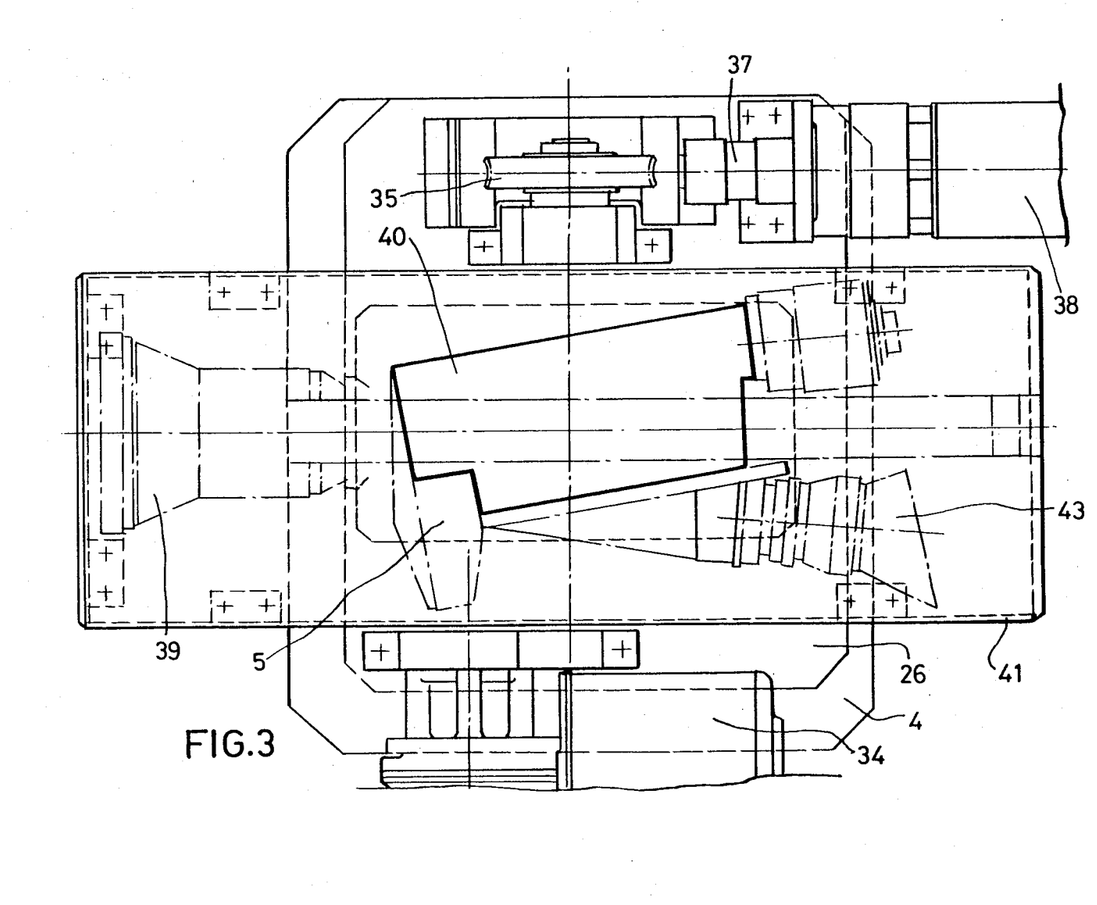
FIG. 3 is a view from above, with partial cut-away sections, on a larger scale of the camera-holder plate equipped with a camera and its orientation motors.
Figure 5:
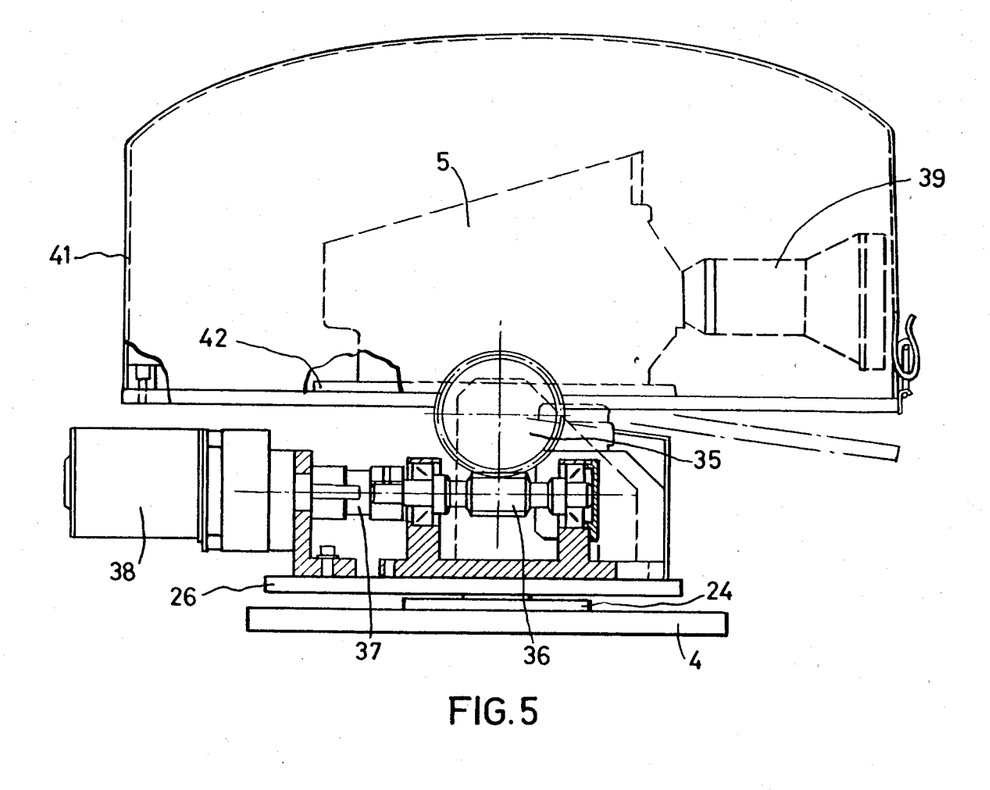
FIG. 5 is a longitudinal section of the equipped camera holder plate shown in FIG. 3.

In order to allow the adjustment in rotation of the second intermediary plate 26, a toothed wheel 31 is keyed on shaft 23 integral with the base 4 and meshes with a worm gear (not shown) and driven in rotation by a transmission shaft 32, represented in shifted section in FIG. 4 and connected, through the intermediary of a gear transmission box 33, to an electrically driven motor 34 (FIG. 3). The driving in rotation of the second orientation shaft 29 is ensured by a toothed wheel 35 keyed on shaft 29 and which meshes with a worm gear 36 connected by a transmission 37 to an electric motor 38 (FIG. 5). The camera 5 with its objective 39 and rolls of film 40 is protected by a removable cover 41 with the use of hooks and can be easily withdrawn from plate 30 by unscrewing from a camera stand 42.

Camera 5 and electric orientation motors 34 and 38 are connected by cables (not shown) to a control station provided in the carrier vehicle 1 and to which is also connected the rotation jack 8 and parallelogram jack 9 that can be hydraulic jacks but which, for the control of a camera mounted on a vehicle, are generally electric jacks which can be provided with internal friction damping. Independent shock absorbers, for example, hydraulic, can be mounted in parallel to jacks 8 and 9 in appropriate points of the orientation stage 3.

The operation of the device according to the invention will now be explained. Automotive vehicle 1, for example, intends to follow the journey of a motorcyclist on a winding road from a position on the left of the motorcyclist after folding back platform 7 to the level of the right hand door of the vehicle. Camera 5 must, during its journey, continuously place itself opposite the motorcyclist by outlining him as best as possible. The remote control of camera 5 is entrusted to an operator occupying the front passenger seat of vehicle 1. During the journey, the camera-holder 2 is subject to intense vibrations of which those in the frequency range of 25-40 Hz are the most harmful for the quality of the image. The operator of arm 2 positions the first orientation stage 3 in slow speed by successive corrections and fastenings 11 and 12 as well as shock absorbers that are external or mounted in jacks 8 and 9 and absorbs and damps the harmful vibrations for camera 5.

Through the use of a switch-bar mounted on the dash board 6 of vehicle 1, the operator can simultaneously control the direction and the speed of rotation of the electric motors 34 and 38 in order to continually position the objective 39 of the camera 5 on the field to be filmed that appears to him in direct optical vision with the use of an optical reflection on the view-finder 43 of the camera or more generally with the use of a video control screen mounted in vehicle 1 in the case of utilization of a television camera.

The oepator can thus follow from the inside of the motorcar the action of a moving spectacle taking place at high speed such as a bicycle or automobile race by remotely controlling the whole of the displacements of camera 5. The first orientation stage 3 can be provided with an angular limit 44 (see FIG. 1) relatively limited in the two rotation axes and strokes 45 and 46 of camera 5 in orthogonal planes with respect to base 4 are also limited, but the addition of these two strokes on the two orientation stages 3 and 21 allow sweeping a very wide field. The first stage 3 is generally preoriented prior to the beginning of view operations at high speed and fulfills during this operation, essentially the role of a shock absorber for harmful vibrations that was previously fulfilled by the bearer of the camera borne by vehicle 1. For greater efficiency in filtering the vibrations, the frequencies of the first stage 3 and second stage 21 are advantageously uncoupled and static shock absorbers such as silent blocks can be interposed between the rigid intermediary support 20 and the first intermediary plate 22. Of course, the present invention is in no way limited to the embodiments described and represented herein and can be adapted to numerous variants available to one skilled in the art, without departing from the spirit and scope of the invention.

Thus, the camera holder plate 30 can receive other tracking equipment such as view-finders, arms, painting and sanding heads, spindles of machine tools, or wheel grinders, that it is desired to position rapidly and with a good vibration filtration. The control of orientation jacks 8 and 9 and electric motors 34 and 38 can furthermore be realized by a digital control center (NCN) or a dynamic positioning computer.

According to another variant of realization allowing camera 5 to rotate on an angle as wide as 360° or more relative to the fastening point on the vehicle, the higher and lower arms 13, 14, 15 of the first orientation stage are articulated on a rotating support replacing support 16, but are able to rotate under action and control of a rotation motor made for example, of an electric motor and intermediary gear trains. A remote control reference such as a recopy potentiometer allows location of the first stage azimuthal orientation relative to the vehicle. The sight on the camera field by the intermediary of a view finder or a video remote control screen allows a faithful remote control of the combined displacements of the two orientation stages for obliging the camera to stay trained on a movable subject to be filmed.

The camera of the apparatus fixed on the support and remotely controlled from the vehicle (the apparatus may be an arm, a machining or treating head) may be fastened to the mobile apparatus or vehicle at a point ensuring either, on the one hand, the steadied position and/or immunity against the harmful vibrations which are able to be induced by the vehicle (this point may be the vehicle roof) or, on the other hand, the best visibility in service.

In the case of a helicopter, the apparatus underbelly allowing the best visibility in the ground direction during flight, constitutes an advantageous fastening point for the support of the first orientation stage. This stage, while rotating on an angle as wide as 360° permits reaching all the azimuths without changing the flight direction. The first orientation stage may equally allow the folding out of the camera on the helicopter side before its landing (which allows a little space between its underbelly and the ground).

It is of course to be understood that the first stage rotation may be carried out on an angle wider than a complete turn or 360° but ought in any respect be limited by abutments for avoiding the destruction of the transmission and remote control threads and cables which are interposed between the vehicle and the camera and orientation stages. On the contrary, the stroke angles of the camera holder plate 30 may be limited to much lower values than the first orientation stage rotation angle, these angles being in the order of 60°.

What is claimed is:

1. A device for remotely controlling the position and orientation of a target following element borne by a vehicle, comprising:

a first support member including two arms and an intermediary bracket, said arms having first ends pivotally mounted in a substantially vertical plane to said vehicle for movement in said substantially vertical plane and about said substantially vertical plane, and opposite, second ends pivotally secured to said intermediary bracket to form a pivoting parallelogram structure, with said intermediary bracket always remaining in a substantially upright position during said movement of said arms;

said first support member including a parallelogram jack pivotally secured between a substantially fixed point of the parallelogram structure and one of said arms for pivoting said arms in said substantially vertical plane;

said first support member including a rotation jack pivotally secured between a fixed point of the vehicle and at least one of said arms for rotating said arms about said substantially vertical plane;

a second support member secured to the intermediary bracket for bearing the target following element and including orientation motors for orienting said target following element in inclination and azimuth relative to said first intermediary bracket; and remote control means provided within the vehicle for controlling the parallelogram and rotation jacks of said first support member and the orientation motors of said second support member, to cause the target following element to follow a travelling mobile unit.

2. A device according to claim 1, wherein the parallelogram and rotation jacks of the first support member move said first support member only at slow angular speeds, whereas the orientation motors of the second support member move said second support bracket at faster angular speeds, whereby vibrations transmitted by the vehicle to the first intermediary bracket are damped out by slow movements of said first support member and the target following element follows the travelling mobile unit mainly by controlling the orientation motors of the second support member.

3. A device according to claim 1, wherein said second support member includes a first intermediary plate connected to the intermediary bracket, a first vertical orientation shaft supported on said first intermediary plate, a second intermediary plate rotatably mounted in a substantially horizontal plane about said first orientation shaft and the position of which in rotation is controlled by an azimuth orientation motor, and a second horizontally oriented shaft rendered rigidly integral with the target following element and supported on the second intermediary plate, the rotation of the second shaft in a substantially horizontal plane being controlled by an orientation motor for orientation in inclination of the target following element.

4. A device according to claim 3, wherein the first intermediary plate is adjustably fitted on the intermediary bracket at such a level that the center of gravity of equipment that it bears is substantially placed half-way between the two pivoting points of the arms on the intermediary bracket.

5. A device according to claim 1, wherein at least one of the parallelogram jack and the rotation jack of the first support member is provided with damping means for damping vibrations induced by the vehicle when travelling.

6. A device according to claim 1, wherein the parallelogram and rotation jacks of the first support member cooperate with at least one shock absorber element for damping displacements of the arms caused by said parallelogram and rotation jacks.

7. A device according to claim 6, wherein the at least one shock absorber element is included in at least one of the parallelogram structure, the rotation jack and the motor.

8. A device according to claim 6, wherein each said shock absorber element is a relaxation shock absorber allowing low oscillation frequencies of the vehicle at about 1 to 1.5 Hz to pass and damping out higher frequencies above about 25 Hz.

9. A device according to claim 1, wherein the first support member is mounted on the vehicle through the intermediary of a suspension, the stiffness of which is selected for good filtration of average vibration frequencies of the vehicle between 1.5 to 25 Hz.

10. A device according to claim 1, wherein the first support member is mounted on the vehicle in a region where high frequencies in the range of 25 to 40 Hz vibrations which are particularly harmful for the taking of photographs by camera, are relatively diminished, and through the intermediary of a suspension adapted to filter such high vibration frequencies.

11. A device according to claim 1, wherein the first support member is rotatable by a rotation motor for an angle larger than 360° while being limited in its rotation stroke by abutments which forbid the destruction of cables connecting it to the vehicle, whereas stroke angles of the second support member are limited to lower values in the order of 60°, whereby all azimuths can be swept by rotation of the first support member while reducing the bulkiness of the second support member.

* * * * *

UNITED STATES PATENT AND TRADEMARK OFFICE
CERTIFICATE OF CORRECTION

PATENT NO. : 4,614,943

DATED : September 30, 1986

INVENTOR(S) : Gilles Boucher

It is certified that error appears in the above-identified patent and that said Letters Patent is hereby corrected as shown below:

On the title page assignee should read

--(73) Assignee: Cinaction, Paris, France --.

Signed and Sealed this

Twenty-eighth Day of April, 1987

Attest:

DONALD J. QUIGG

Attesting Officer

Commissioner of Patents and Trademarks